Patented Feb. 20, 1934

1,947,983

UNITED STATES PATENT OFFICE 1,947,983

REMOVAL OF SULPHUR AND OF SULPHUR AND AMMONIA FROM GASES

Wilhelm Gluud, Fritz Brodkorb, and Walter Klempt, Dortmund-Eving, Germany, assignors to Gesellschaft für Kohlentechnik m. b. H., Dortmund-Eving, Germany No Drawing. Application December 19, 1930, Serial No. 503,608, and in Germany December 20, 1929

3 Claims. (Cl. 23—225)

The extraction of sulphuretted hydrogen from gases has heretofore been effected by washing the gas with a suspension of ferric hydroxide, whereupon the iron sulphide formed was regenerated in a tower attached to the washing apparatus by oxidation with air to ferric hydroxide with separation of sulphur, in order to enable the regenerated ferric hydroxide again to serve to combine with the sulphuretted hydrogen in the washer. The sulphur thus obtained could heretofore only be effectively utilized with great expenditure, due to its content of iron, and various methods have been suggested for the solution of this problem.

It has now been found that it is a great advantage completely, or as far as possible, to prevent the separation of this raw sulphur and this is achieved if a sufficient quantity of sulphites is provided in the alkaline washing fluid in order to dissolve the sulphur formed at the oxidation of FeS, mainly as thiosulphate. The further advantage is then obtained that at the same time, by the air oxidation, a portion of the added sulphite is transformed into sulphate. The addition of the required quantity of sulphite can be carried out in such a manner that either free $SO_2$ is introduced in a gaseous form into the oxidation apparatus, or, instead, roasting gas is used, or any available sulphite or bisulphite solutions or the solid salts or their suspensions are added direct to the washing fluid, it being immaterial whether this is effected in the regenerating apparatus or in the washing device. Likewise $SO_2$ and gas containing $SO_2$ can be introduced direct into the washer instead of the regenerating apparatus. $SO_2$ of any suitable source can be used to generate the necessary sulphite, for example, a portion of the raw sulphur, extracted in this manner, as described below, can be utilized, or alternatively also raw sulphur formed in the washing process. To facilitate the solution of the sulphur the proces should be carried out at a suitable temperature, for example, in the case of strongly concentrated salts a temperature of about 40° is recommended.

When the process is carried out, for example with coke gas containing ammonia the content of the solution in ammonium thiosulphate and ammonium sulphate in the washing liquid increases continuously simultaneously with a corresponding increase in the quantity of sulphuretted hydrogen retained in the washer. A portion of the solution can then always be drained off, the iron mud precipitated and added to the washer and the strong ammonium thiosulphate worked up in any known manner into sulphate or sulphate and sulphur or other products. If the ammonia is to be completely recovered, the gas is washed after the sulphuretted hydrogen washer in a second washer with a solution of acid ammonium sulphite containing bisulphite, which can be kept acid by adding $SO_2$ and which contains per 1 part sulphite more than 1 part bisulphite. According to the satisfactory concentration of ammonium sulphite this solution can be added to the sulphur washer (first washer) in a neutralized condition and thus assist in forming thiosulphate.

We claim:—

1. Method of removing sulphuretted hydrogen from gases comprising treating said gases with an alkaline aqueous suspension of iron hydroxide, oxidizing the iron sulphide contained in said suspension with oxidizing gas in an ammonical solution in the presence of sulphite.

2. Method of removing sulphuretted hydrogen from gases, consisting in washing said gases with a washing liquid comprising an alkaline suspension of iron hydroxide, regenerating said washing liquid by oxidation in an ammonical solution in the presence of sulphite, using said regenerated washing liquid for further extraction of sulphur, progressively adding to said washing liquid sulphur dioxide values in proportion to the sulphur extracted, progressively withdrawing washing liquid and treating said withdrawn liquid to recover saline values comprising combined sulphur.

3. Method for the removal of hydrogen sulphide from gases, consisting in subjecting said gases to the action of iron hydroxide in aqueous suspension, regenerating said iron hydroxide by oxidation in an ammonical solution in the presence of sulphite, collecting sulphur liberated in said oxidation process and utilizing the said sulphur for the production of sulphur dioxide values required in said regeneration process.

WILHELM GLUUD.
FRITZ BRODKORB.
WALTER KLEMPT.